United States Patent
Ceccarelli et al.

(10) Patent No.: US 10,250,492 B2
(45) Date of Patent: Apr. 2, 2019

(54) SEGMENT RECOVERY IN CONNECTION-ORIENTED NETWORK

(75) Inventors: Daniele Ceccarelli, Genoa (IT); Diego Caviglia, Savona (IT); Paolo Rebella, Bergeggi (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1184 days.

(21) Appl. No.: 13/993,286

(22) PCT Filed: Dec. 15, 2010

(86) PCT No.: PCT/EP2010/069804
§ 371 (c)(1),
(2), (4) Date: Oct. 18, 2013

(87) PCT Pub. No.: WO2012/079630
PCT Pub. Date: Jun. 21, 2012

(65) Prior Publication Data
US 2014/0029416 A1    Jan. 30, 2014

(51) Int. Cl.
*H04L 12/703* (2013.01)
*H04L 12/707* (2013.01)
*H04L 12/723* (2013.01)

(52) U.S. Cl.
CPC .............. *H04L 45/28* (2013.01); *H04L 45/22* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 6,366,556 B1* | 4/2002 | Ballintine | H04J 3/085 370/216 |
| 2002/0129295 A1* | 9/2002 | Nishioka | H04B 10/035 714/4.1 |

(Continued)

FOREIGN PATENT DOCUMENTS

WO    2010031443 A1    3/2010

OTHER PUBLICATIONS

International Search Report, Application No. PCT/EP2010/069804, dated Jul. 5, 2011, 4 pages.

(Continued)

*Primary Examiner* — Duc T Duong
(74) *Attorney, Agent, or Firm* — NDWE, LLP

(57) ABSTRACT

A connection-oriented network has a working path and a segment recovery path for a segment of the working path. The working path has a branch node at an end of the segment where the segment recovery path connects to the working path. The branch node is not located at an end node of the working path. Control plane signalling is received at an end node of the working path from a node along the working path, indicating that a failure has occurred along the working path. The end node determines, from the received control plane signalling, if the failure has occurred outside the segment of the working path. When it is determined that the failure has occurred outside the segment of the working path, a notification is sent to the branch node. The notification is an instruction not to reroute to the segment recovery path.

22 Claims, 11 Drawing Sheets

(56) References Cited

U.S. PATENT DOCUMENTS

| | | | | |
|---|---|---|---|---|
| 2003/0063613 | A1* | 4/2003 | Carpini | H04L 45/02 370/401 |
| 2005/0207337 | A1* | 9/2005 | Oda | H04L 45/10 370/214 |
| 2006/0274645 | A1* | 12/2006 | Bradford | H04L 41/0677 370/216 |
| 2007/0183317 | A1* | 8/2007 | Vasseur | H04J 3/14 370/225 |
| 2007/0211623 | A1* | 9/2007 | Nishioka | H04L 41/0663 370/218 |
| 2007/0230358 | A1* | 10/2007 | Narayanan | H04L 12/5695 370/244 |
| 2007/0280102 | A1* | 12/2007 | Vasseur | H04J 3/14 370/225 |
| 2008/0049621 | A1* | 2/2008 | McGuire et al. | 370/236.2 |
| 2009/0310482 | A1* | 12/2009 | Asaie et al. | 370/225 |
| 2009/0323522 | A1* | 12/2009 | Deguchi | H04L 41/08 370/228 |
| 2010/0157813 | A1* | 6/2010 | Matsuura | H04L 41/06 370/242 |
| 2010/0238795 | A1 | 9/2010 | Boutros et al. | |
| 2011/0038253 | A1* | 2/2011 | Yabusaki | H04L 45/02 370/217 |
| 2011/0058501 | A1* | 3/2011 | Harada | H04L 41/12 370/254 |
| 2011/0229122 | A1* | 9/2011 | Castoldi et al. | 398/2 |
| 2012/0044800 | A1* | 2/2012 | Coltro | H04J 3/14 370/217 |
| 2012/0106948 | A1* | 5/2012 | Moynihan et al. | 398/10 |
| 2012/0207017 | A1* | 8/2012 | Ceccarelli et al. | 370/227 |
| 2013/0021918 | A1* | 1/2013 | Fiorone et al. | 370/242 |

OTHER PUBLICATIONS

E. Mannie, "Generalized Multi-Protocol Label Switching (GMPLS) Architecture," Oct. 2004, 69 pages, Network Working Group, Request for Comments: 3945, The Internet Society.

J.P. Lang et al., "RSVP-TE Extensions in Support of End-to-End Generalized Multi-Protocol Label Switching (GMPLS) Recovery," May 2007, 47 pages, Network Working Group, Request for Comments: 4872, The IETF Trust.

L. Berger et al., "GMPLS Segment Recovery," May 2007, 25 pages, Network Working Group, Request for Comments: 4873, The IETF Trust.

Written Opinion, Application No. PCT/EP2010/069804, published Jun. 15, 2013, 6 pages.

International Preliminary Report on Patentability, Application No. PCT/EP2010/069804, dated Jun. 27, 2013, 8 pages.

IEEE Std 802.1Qay-2009, IEEE Standard for Local and Metropolitan Area Networks—Virtual Bridged Local Area Networks, Amendment 10: Provider Backbone Bridge Traffic Engineering, The Institute of Electrical and Electronics Engineers, Inc., Aug. 5, 2009, 145 pages.

* cited by examiner

SEGMENT RECOVERY IN CONNECTION-ORIENTED NETWORK

CROSS-REFERENCE TO RELATED APPLICATIONS

This application is a National stage of International Application No. PCT/EP2010/069804, filed Dec. 15, 2010, which is hereby incorporated by reference.

TECHNICAL FIELD

This invention relates to connection-oriented networks, and to recovery of connections in such a network.

BACKGROUND

In a connection-oriented network with a Generalised Multi-Protocol Label Switching (GMPLS) control plane it is possible to establish a connection, called a Label Switched Path (LSP), between network nodes. It is desirable that a network is resilient to the failure of a span (link) between nodes, or to a node. GMPLS includes signalling extensions which support recovery. Recovery provides a way of detecting a failure on a working path, signalling the occurrence of the failure, and then transferring traffic from the working path LSP to a recovery path.

It is possible to recover an end-to-end Label Switched Path (LSP). This is called end-to-end recovery and is defined in IETF document [RFC4872] "RSVP-TE Extensions in Support of End-to-End Generalized Multi-Protocol Label Switching (GMPLS) Recovery". It is also possible to recover a part of an end-to-end LSP. This is called segment recovery and is defined in IETF document [RFC4873] "GMPLS Segment Recovery".

FIG. 1 shows a simple network 5 with nodes N1-N7. An end-to-end Label Switched Path (LSP) 10 connects node N1 to node N7 along the path N1-N2-N3-N4-N5-N7. N1 is called an Ingress Node and N7 is called an Egress Node. The network 5 has a recovery mechanism for a segment 11 of the LSP 10, between nodes N2 and N5, i.e. for segment N2-N3-N4-N5. The segment 11 has a segment recovery path 12 routed via node N6, i.e. path N2-N6-N5. Node N2 initiates the segment recovery path and is called a branch node. Node N5 terminates the segment recovery path and is called a merge node. Procedure and messages used to create and activate both the worker and the segment recovery LSP are described in [RFC4873] and [RFC4872]. Segment recovery provides resilience against a failure of spans N2-N3, N3-N4, N4-N5 or against failure of nodes N3, N4.

There are two mechanisms by which a failure in the network can be signalled. FIG. 2 shows the network 5 of FIG. 1 with a failure on the span between nodes N3 and N4. Firstly, a failure can be detected via a data plane Operation Administration and Management (OAM) mechanism and signalled, for example, by an Alarm Indication Signal (AIS) 13 which travels with the data along the working path 10. This is a quick mechanism and helps to ensure that a recovery operation can be concluded within a short time period, such as 50 ms. Secondly, a failure can be detected and signalled by a control plane mechanism. In FIG. 2, nodes N3 and N4 each detect a failure and send a signalling message 14, such as a Resource Reservation Protocol Traffic Engineering (RSVP-TE) Notify message, to the branch node N2. The control plane mechanism is useful in a network that does not have the capability of detecting failures directly from the data plane. The two mechanisms described here can co-exist. This means that branch node N2 may receive data plane signalling 13 and control plane signalling 14 in response to a failure of a span or node. In FIG. 2, the branch node N2 is in charge of activating the segment recovery procedure.

FIG. 3 shows the network of 5 of FIG. 1 with a failure on the span between nodes N5 and N7. Here, still considering the case of a bi-directional working path 10, the branch node N2 detects the failure of the working LSP 10 via data plane signalling (e.g. AIS) 13 and therefore will start the activation of segment recovery LSP 12 (N2-N6-N5). However, it can be seen that this recovery operation has no useful effect. Following transfer of traffic to the segment recovery path 12, there is still an end-to-end LSP between N1 and N7 which includes the failed section N5-N7. A further disadvantage of this behaviour is that the data plane failure detection signalling can be forwarded by node N5, along the recovery LSP 12, to node N2, causing node N2 again to perform a recovery operation back to the working path 10. This undesirable cycle of behaviour could be repeated a high number of times, preventing traffic from reaching the egress node N7.

SUMMARY

A first aspect of the invention provides a method of operating a node in a connection-oriented network in which there is a working path and a segment recovery path for a segment of the working path. The working path has a branch node at an end of the segment where the segment recovery path connects to the working path. The branch node is not located at an end node of the working path, i.e. the branch node is separate from (offset from) an end node of the working path. The method comprises receiving control plane signalling at an end node of the working path from a node along the working path, indicating that a failure has occurred along the working path. The method further comprises determining, from the received control plane signalling, if the failure has occurred outside the segment of the working path. When it is determined that the failure has occurred outside the segment of the working path, the branch node is notified.

A branch node is notified when a failure has occurred outside the segment of the working path for which it is responsible. This allows the branch node to prevent an unnecessary transfer of traffic to the segment recovery path, or to revert an unnecessary transfer of traffic to the segment recovery path, if the transfer has already taken place in response to data plane failure detection signalling. This avoids unnecessary use of the recovery path resources. This is especially advantageous if the recovery path resources are shared by multiple working paths. It can also prevent undesirable network behaviours, such as repeated transfer of traffic between the working path and the recovery path.

Another aspect of the invention provides a method of operating a branch node in a connection-oriented network in which there is a working path and a segment recovery path for a segment of the working path. The branch node is located at an end of the segment where the segment recovery path connects to the working path. The branch node is not located at an end node of the working path. The method comprises requesting to be notified when a failure occurs outside the segment of the working path.

The network can have a Generalised Multi-Protocol Label Switching (GMPLS) or a Multi-Protocol Label Switching (MPLS) control plane. Data plane connections can be packet based or can use any of a range of other data plane technologies such as wavelength division multiplexed traffic (lambda), or time-division multiplexed (TDM) traffic such as Synchronous Digital Hierarchy (SDH). The data plane can be an MPLS or an MPLS-TP data plane. The recovery scheme can also be applied to other connection-oriented technologies such as connection-oriented Ethernet or Provider Backbone Bridging Traffic Engineering (PBB-TE), IEEE 802.1Qay.

The term "failure detection" is intended to include detection of a fault or failure.

The term "recovery" is intended to include "protection", which typically means that a recovery path is preconfigured in advance of detecting any fault or failure, as well as "restoration", which typically means that signalling to configure a recovery path occurs after detection of failure.

Further aspects of the invention provide apparatus for implementing any of the described or claimed methods. An aspect of the invention provides apparatus for use at a node of a connection-oriented network in which there is a working path and a segment recovery path for a segment of the working path. The working path has a branch node at an end of the segment where the segment recovery path connects to the working path. The branch node is not located at an end node of the working path. The apparatus comprises a control plane signalling module arranged to receive an indication from a node along the working path that a failure has occurred along the working path. The control plane signalling module is further arranged to determine, from the indication, if the failure has occurred outside the segment of the working path. When it is determined that the failure has occurred outside the segment of the working path, the control plane signalling module is arranged to notify the branch node.

Another aspect of the invention provides apparatus for use at a branch node of a connection-oriented network in which there is a working path and a segment recovery path for a segment of the working path. The branch node is located at an end of the segment where the segment recovery path connects to the working path. The branch node is not located at an end node of the working path. The apparatus comprises a control plane signalling module arranged to send a request for the branch node to be notified when a failure occurs outside the segment of the working path.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium or non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
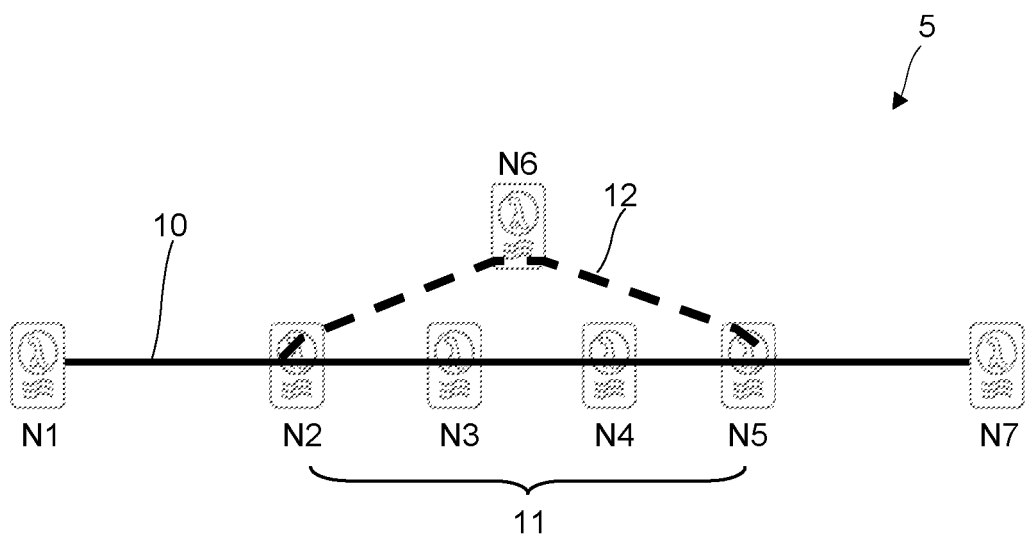
FIG. 1 shows a network with a working path and a segment recovery path.
Figure 2:
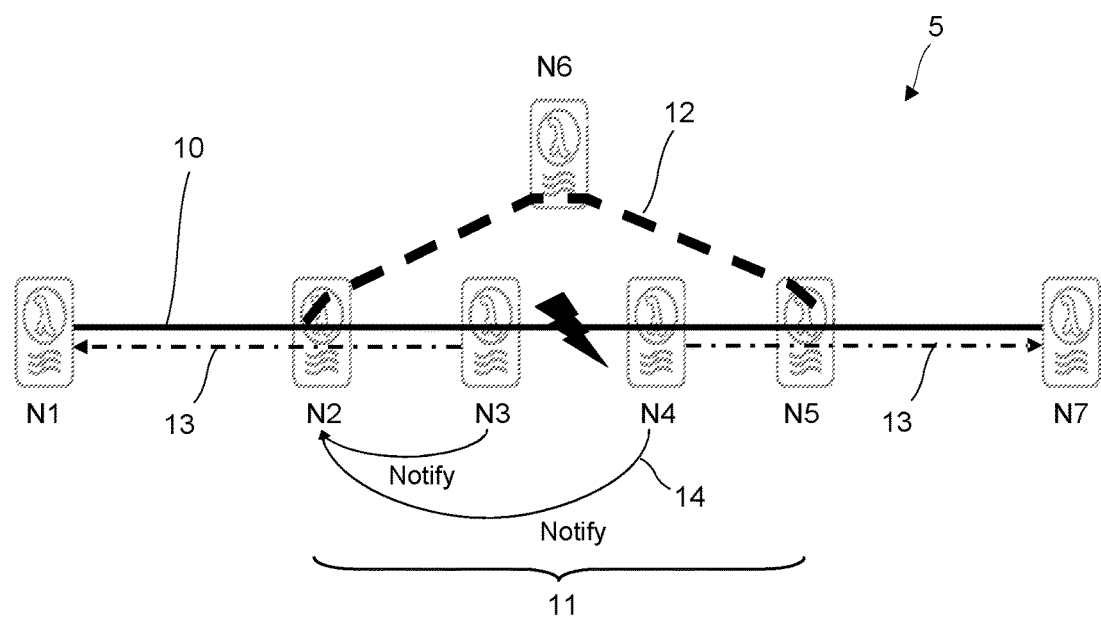
FIG. 2 shows signalling in the network of FIG. 1 when a failure occurs in the working path inside the segment covered by the segment recovery path.
Figure 3:
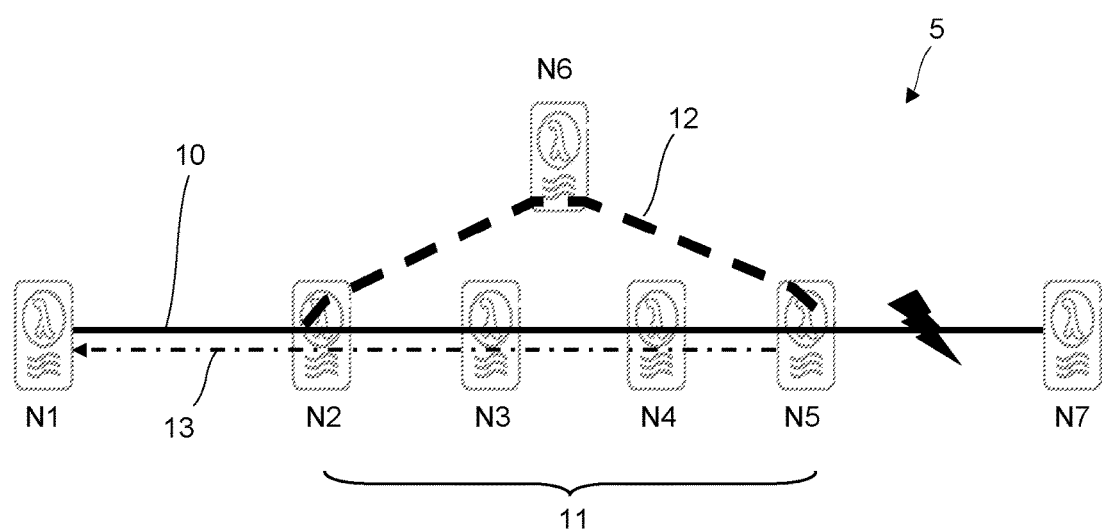
FIG. 3 shows signalling in the network of FIG. 1 when a failure occurs in the working path outside the segment covered by the segment recovery path.

FIGS. 4 to 7 show the same network 5 as previously described in FIGS. 1 to 3 with nodes N1-N7. A working path Label Switched Path (LSP) 10 and a segment recovery path LSP 12 are established in the network 5 in a conventional manner, such as by Resource Reservation Protocol Traffic Engineering (RSVP-TE) signalling. The working path 10 connects node N1 to node N7 along the path N1-N2-N3-N4-N5-N7. A segment 11 of the working path has a segment recovery path 12 routed via node N6, i.e. path N2-N6-N5. N1 is called an Ingress Node and N7 is called an egress node. Node N2 is called a branch node and node N5 is called a merge node. The particular type of transport technology used to form the working path 10 and segment recovery path 12 is unimportant. The network 5 can use a circuit-switched technology such as Synchronous Digital Hierarchy (SDH) or Wavelength Division Multiplexed (WDM), or a packet-switched technology such as Ethernet.

Figure 4:
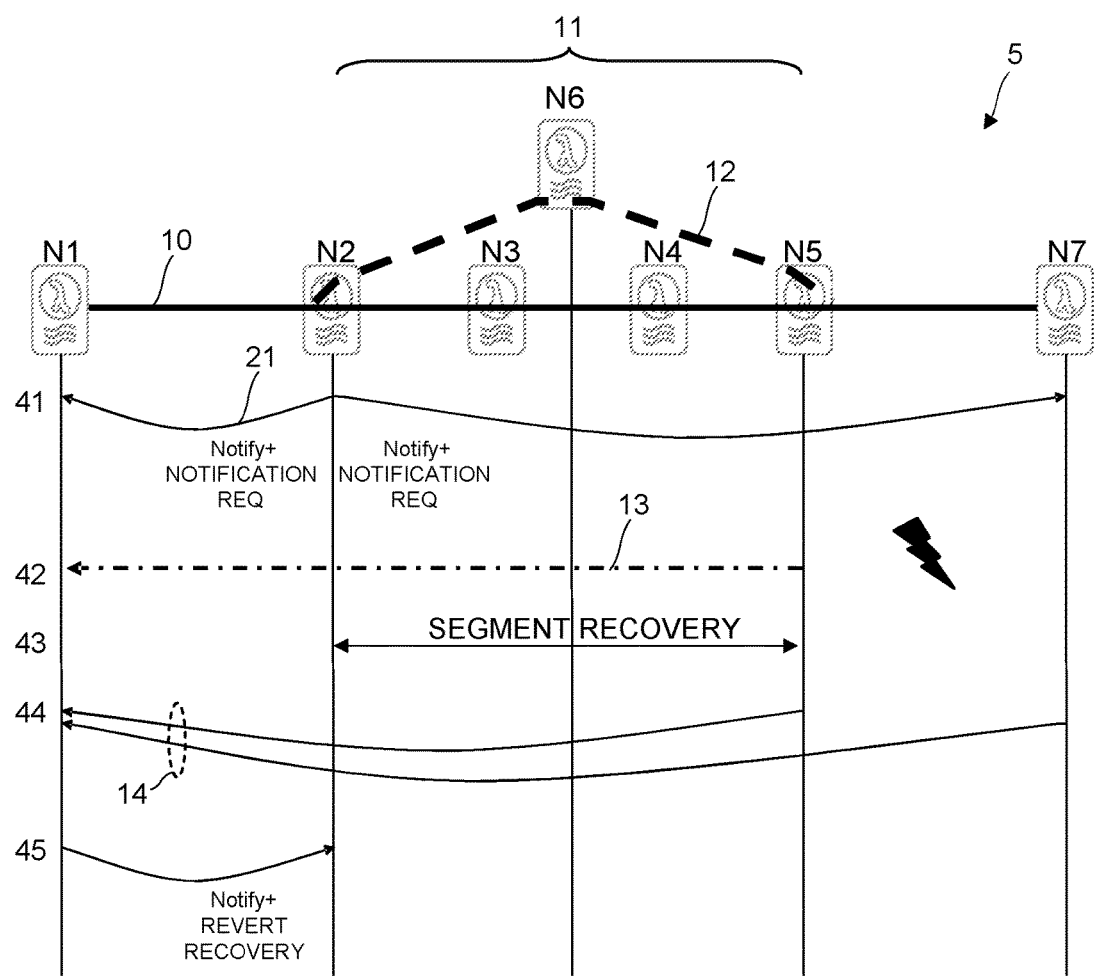
FIG. 4 shows signalling in the network of FIG. 1 in accordance with an embodiment of the present invention when a failure occurs in a bi-directional working path outside the segment covered by the segment recovery path.
Figure 5:
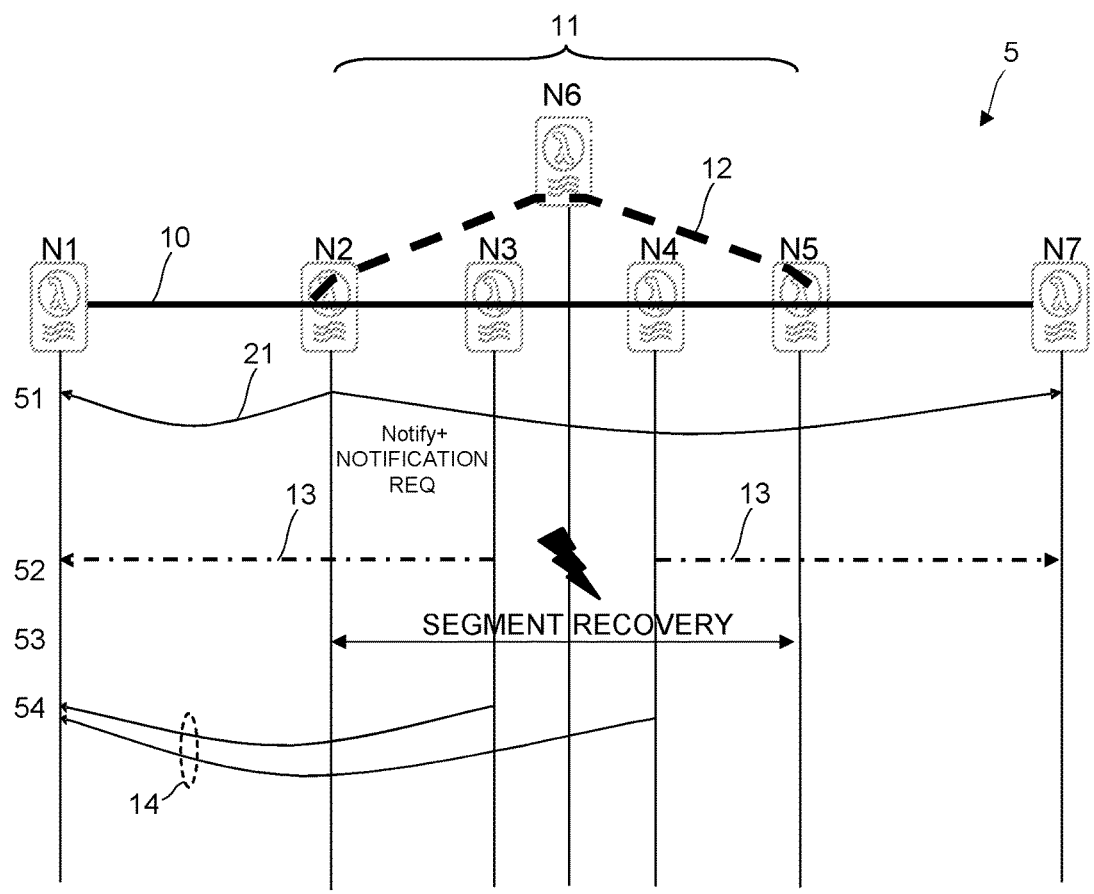
FIG. 5 shows signalling in the network of FIG. 1 in accordance with an embodiment of the present invention when a failure occurs in a bi-directional working path inside the segment covered by the segment recovery path.

FIGS. 4 and 5 show two possible types of failure that can occur in the network 5. FIG. 4 shows a failure on the span N5-N7. This will be called an external failure, as it is a failure outside the segment 11 covered by the segment recovery mechanism. FIG. 5 shows a failure on the span N3-N4. This will be called an internal failure, as it is a failure inside the segment 11 covered by the segment recovery mechanism.

FIG. 4 shows signalling between nodes of network 5 in accordance with an embodiment of the invention in the case of an external failure. At some time (step 41) after the working path LSP 10 and segment recovery LSP have been set up, the branch node N2 signals to the ingress node N1 and egress node N7 requesting to be informed when a failure occurs outside the segment 11. The signalling at 41 can send an RSVP-TE Notify message with a newly defined NOTIFICATION REQUEST object, as will be described later.

At a later time (step 42) a failure occurs in the span between N5 and N7. The working path 10 in FIG. 4 is a bi-directional working path 10. Node N5, on one side of the failed span N5-N7, sends AIS 13 along the remaining part of the working path 10 towards node N1. Signalling 13 is received by branch node N2 and ingress node N1. At step 43 branch node N2, upon receiving the AIS 13, switches traffic to the recovery path 12. It can be seen that the recovery path 12 does not have a useful effect, as it does not bypass the failure in span N5-N7.

At step 44 nodes N5 and N7 each send control plane signalling 14, indicating the occurrence of failure in span N5-N7, to ingress node N1. Nodes N5 and N7 send the signalling to node N1 because they are nodes of the end-to-end working path 10 and node N1 is the ingress node for the working path 10 and is responsible for activating recovery when a failure occurs in the working path. Ingress node N1 understands that the failure at N5-N7 is outside the segment 11. At step 45 ingress node N1 sends a control plane signalling message to branch node N2. This message informs node N2 that the failure of span N5-N7 is outside the recovery domain of segment. 11. Node N2, upon receiving this message, reverts the segment recovery operation performed at step 43. The message received at step 45 also informs the branch node N2 to lock LSP status until the failure is healed.

FIG. 4 shows the data plane failure detection signalling (AIS) received at branch node N2 before control plane failure detection signalling. This is the normal order of events, as data plane signalling is usually faster than control plane signalling. In the event that data plane failure detection signalling (AIS) is received by branch node N2 after control plane signalling, branch node N2 is alerted that it should not make a segment recovery operation. Consequently, branch node N2 does not perform a segment recovery operation and there is no need to perform a subsequent reverting of the segment recovery.

FIG. 5 shows signalling between nodes of network 5 in accordance with an embodiment of the invention in the case of an internal failure. As in FIG. 4, at some time (step 51) after the working path LSP 10 and segment recovery LSP have been set up, the branch node N2 signals to the ingress node N1 and egress node N7 requesting to be informed when a failure occurs outside the segment 11. The signalling at 51 can send an RSVP-TE Notify message with a newly defined NOTIFICATION REQUEST object, as will be described later.

At a later time (step 52) a failure occurs in the span between N3 and N4. The working path 10 in FIG. 5 is a bi-directional working path 10. Node N3, on one side of the failed span N3-N4, sends AIS 13 along the remaining part of the working path 10 towards node N1. Signalling 13 is received by branch node N2 and ingress node N1. Node N4, on the other side of the failed span N3-N4, sends AIS 13 along the remaining part of the working path 10 towards egress node N7. At step 53 branch node N2, upon receiving the AIS 13, switches traffic to the recovery path 12. It can be seen that the recovery path 12 has a useful effect, as it allows traffic to bypass the failure in span N3-N4.

At step 54 nodes N3 and N4 each send control plane signalling 14, indicating the occurrence of failure in span N3-N4, to ingress node N1. Nodes N3 and N4 also each send control plane signalling, indicating the occurrence of failure in span N3-N4, to branch node N2, as previously shown in FIG. 2. Ingress node N1 understands that the failure at N3-N4 is inside the segment 11. Consequently, ingress node N1 allows branch node N2 to take normal segment recovery operation and no revertive action is necessary.

In FIGS. 4 and 5 it can be seen that ingress node N1 receives control plane signalling messages at steps 44, 54 from a remote side of the failed span. This is possible because the control plane signalling messages are typically sent along a different path to the data plane. For example, in FIG. 4 there can be a different route between node N7 and node N1 (not shown). Control plane signalling can be sent across at least two different routes to improve resiliency to failures in the signalling path. Control plane signalling can be sent by one or more of: a direct in-band control channel which is routed with a TE-link of a span which carries the data-plane, with link components carrying control channel payload for the in-band control channel; a direct out-of-band control channel which follows the same route as the TE-Link but is separate from the TE-Link; an indirect control channel which is routed separately from the TE-Link and via at least one intermediate node.

In the scenarios described above it is assumed that the working path LSP 10 is bi-directional and that data plane failure detection signalling (AIS) 13 propagates in forward and reverse directions from the point of failure. In the bi-directional scenarios, both the ingress node and egress node can have responsibility for activating the recovery path. Similarly, the node at each end of the segment 11 can have responsibility for activating the segment recovery path. For clarity, FIGS. 4 and 5 only show signalling at steps 44, 54 to the ingress node N1, but nodes detecting a failure can also send signalling to the egress node N7. For a bi-directional LSP, the roles of "branch node" and "merge node" depend on which direction of the LSP is being considered.

Unidirectional Paths

The procedures described above can be applied to uni-directional paths. For a uni-directional LSP in the direction N1-N7, node N5 performs the actions described above for branch node N2 and egress node N7 performs the actions described above for ingress node N1. For a uni-directional LSP in the direction N7-N1, node N2 performs the actions of the branch node described above and node N1 performs the actions of the ingress node described above.

Figure 6:
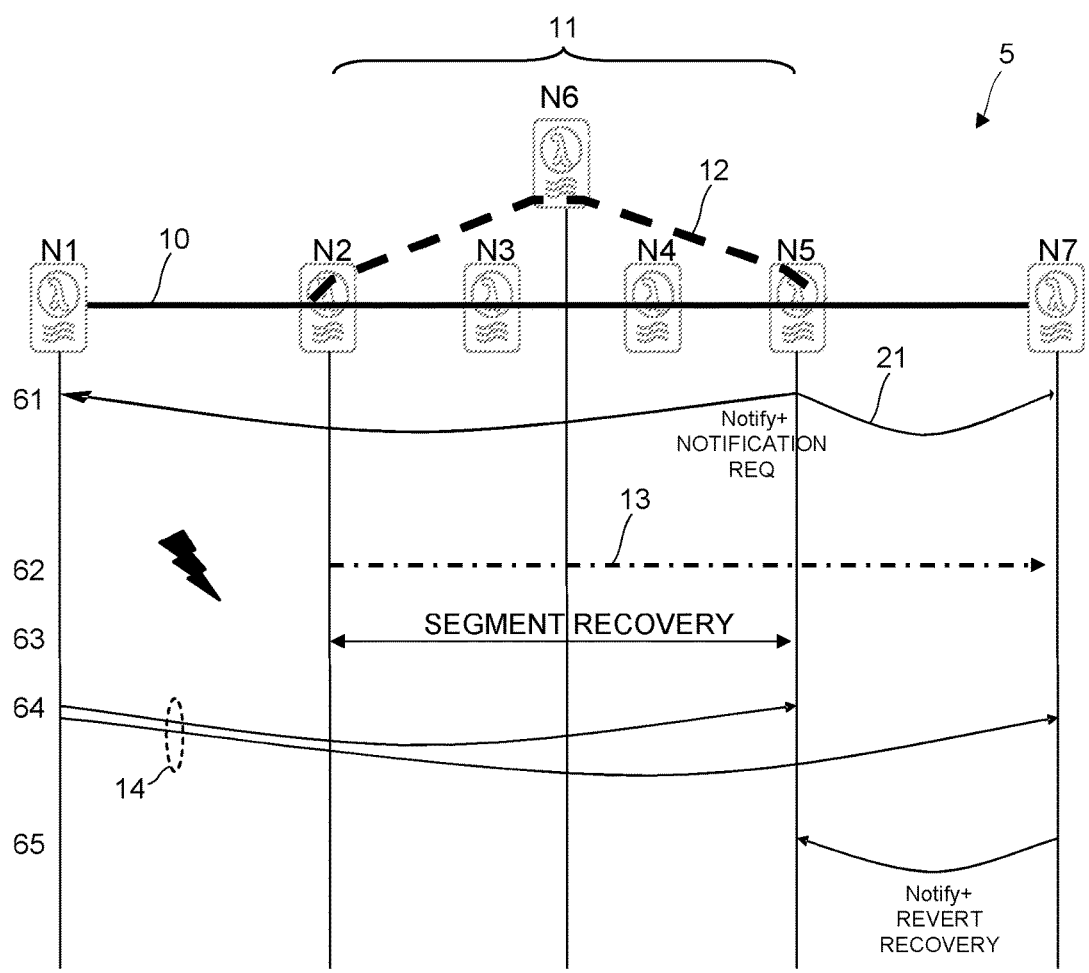
FIG. 6 shows signalling in the network of FIG. 1 in accordance with an embodiment of the present invention when a failure occurs in a uni-directional working path outside the segment covered by the segment recovery path.
Figure 7:
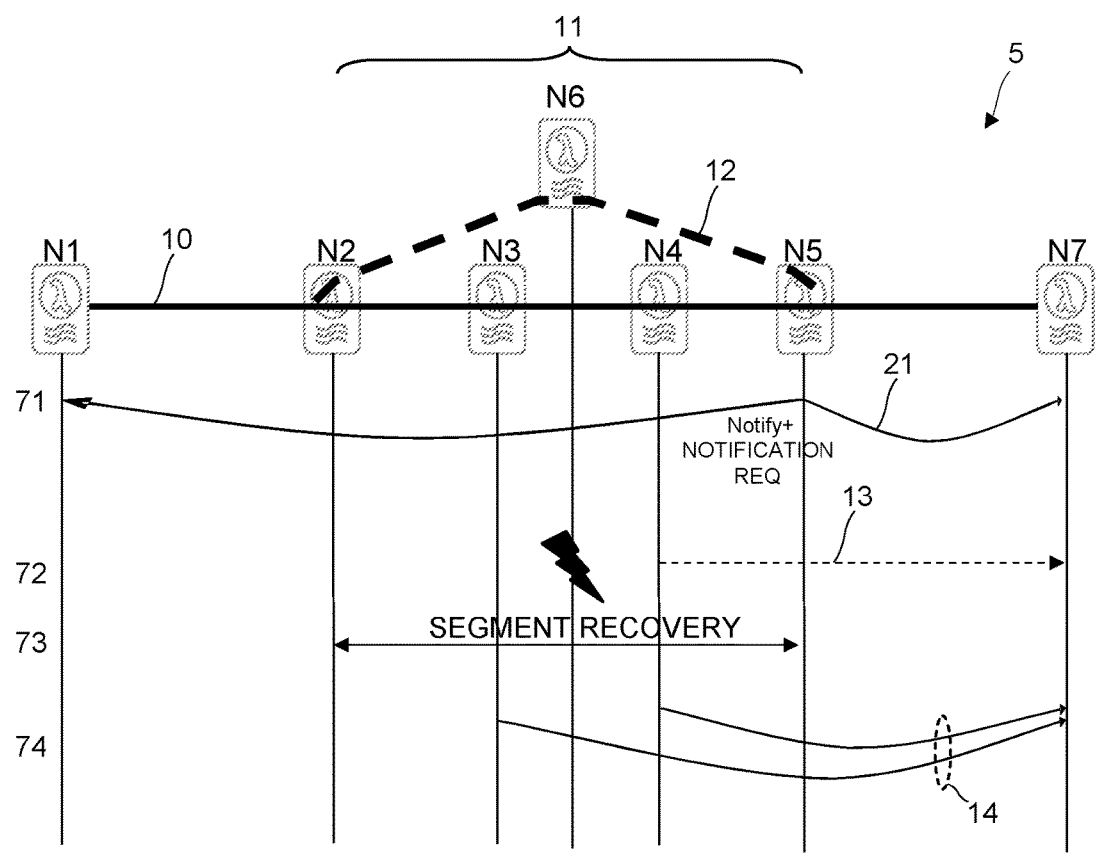
FIG. 7 shows signalling in the network of FIG. 1 in accordance with an embodiment of the present invention when a failure occurs in a uni-directional working path inside the segment covered by the segment recovery path.

This assumption holds because the branch and merge nodes of a segment can perform the recovery switching procedure and both ends of an LSP (ingress and egress) can trigger recovery or send/request notify messages. FIGS. 6 and 7 show signalling in the case of a uni-directional working path LSP 10.

FIG. 6 shows signalling between nodes of network 5 in accordance with an embodiment of the invention in the case of an external failure. At some time (step 61) after the working path LSP 10 and segment recovery LSP have been set up, node N5 signals to the ingress node N1 and egress node N7 requesting to be informed about potentially harmful recovery switching.

At a later time (step 62) a failure occurs in the span between N1 and N2. The working path 10 in FIG. 6 is a uni-directional working path 10. Node N2, on the far side of the failed span N1-N2, sends AIS 13 along the remaining part of the working path 10 towards egress node N7. Signalling 13 is received by node N5 and egress node N7. At step 63 merge node N5, upon receiving the AIS 13, switches traffic to the recovery path 12. It can be seen that the recovery path 12 does not have a useful effect, as it does not bypass the failure in span N1-N2.

At step 64 node N1 sends control plane signalling 14, indicating the occurrence of failure in span N1-N2, to node N5 and to egress node N7. Egress node N7 understands that the failure at N1-N2 is outside the segment 11. At step 65 egress node N7 sends a control plane signalling message to node N5. This message informs node N2 that the failure of span N5-N7 is outside the recovery domain of segment 11. Node N5, upon receiving this message, reverts the segment recovery operation performed at step 63. The message received at step 65 also informs node N5 to lock LSP status until the failure is healed.

FIG. 7 shows signalling between nodes of network 5 in accordance with an embodiment of the invention in the case of an internal failure. As in FIG. 5, at some time (step 71) after the working path LSP 10 and segment recovery LSP have been set up, node N5 signals to the ingress node N1 and egress node N7 requesting to be informed about potentially harmful recovery switching.

At a later time (step 72) a failure occurs in the span between N3 and N4. The working path 10 in FIG. 7 is a uni-directional working path 10. Node N4, on the far side of the failed span N3-N4, sends AIS 13 along the remaining part of the working path 10 towards node N7. At step 73 merge node N5, upon receiving the AIS 13, switches traffic to the recovery path 12. It can be seen that the recovery path 12 has a useful effect, as it allows traffic to bypass the failure in span N3-N4.

At step 74 nodes N3 and N4 each send control plane signalling 14, indicating the occurrence of failure in span N3-N4, to egress node N7. Egress node N7 understands that the failure at N3-N4 is inside the segment 11. Consequently, ingress node N1 allows node N2 to take normal segment recovery operation and no revertive action is necessary.

Signalling Message Format

The behaviour described above can be implemented using RSVP-TE Notify messages. A payload of the message can indicate one of the following:

(i) a branch/merge node wishes to be notified when a failure has occurred outside the recovery domain of the segment. Stated another way, this allows the branch/merge node to request to be notified when it should not reroute traffic to a recovery path.

(ii) an ingress/egress node is notifying a branch/merge node when a failure has occurred outside the recovery domain of the segment. Stated another way, this allows the ingress/egress node to notify the branch/merge node when it should not reroute traffic to a recovery path.

A possible format for the Notify message sent by a branch/merge node [situation (i) above] is as follows:

```
<Notify message> ::= <Common Header> [<INTEGRITY>]
        <MESSAGE_ID_ACK> |
        <MESSAGE_ID_NACK>] ... ]
        [ <MESSAGE_ID> ]
            <ERROR_SPEC> <notify session list>
            <NOTIFY_REQUEST>
Where:
<NOTIFY_REQUEST> object carries a source address = Branch node
and destination address = ingress node/egress node
<ERROR_SPEC> obj includes the parameters:
    ERROR_CODE: 34 Reroute (defined in RFC 5710)
    ERROR_VALUE: 3 Request me NOT to reroute
```

A possible format for the Notify message sent by an ingress/egress node to a branch/merge node [situation (ii) above] is as follows:

```
<Notify message> ::= <Common Header> [<INTEGRITY>]
        <MESSAGE_ID_ACK> |
        <MESSAGE_ID_NACK>] ... ]
        [ <MESSAGE_ID> ]
            <ERROR_SPEC> <notify session list>
            <NOTIFY_REQUEST>
Where:
<NOTIFY_REQUEST> object carries a source address =
ingress node/egress node and destination address = branch node
<ERROR_SPEC> obj includes the parameters:
    ERROR_CODE: 34 Reroute (defined in RFC 5710)
    ERROR_VALUE: 4 Revert recovery
ERROR_VALUEs (3, 4) are suggested values, and other values
can be used.
```

A branch node will send the Notify Message w/NOTIFY_REQUEST obj as soon as the segment recovery LSP has been successfully signalled in the case where the recovery scheme foresees a pre-planned recovery LSP or as soon as the working LSP has been successfully set-up in the case the recovery scheme is full rerouting. A pre-planned recovery is a protection mechanism where the protection path has already been computed or both computed and reserved, Full rerouting is a mechanism where everything is done on-the-fly as soon as a failure is detected (i.e. computation and signalling).

Figure 8:
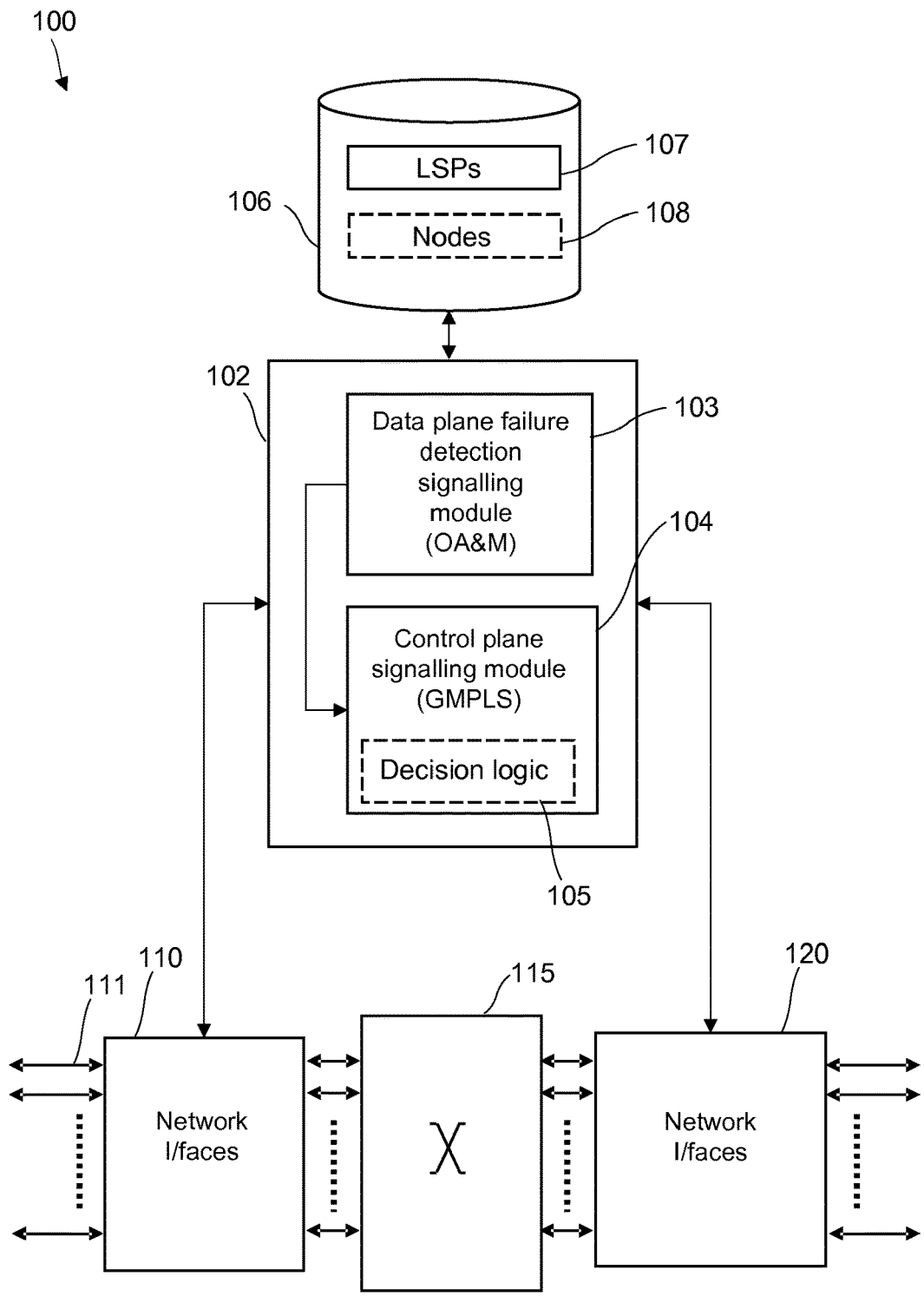
FIG. 8 shows a node of the network.

FIG. 8 shows a node 100 for use in the network of FIGS. 4 to 7. The node 100 has network interfaces 110, 120 for connecting to network spans. The network spans can be electrical, optical or wireless. Typically, the node also has a switching function 115 for switching traffic between ports of respective network interfaces 110, 120.

A controller 102 performs monitoring and signalling functions. A data plane fault detection signalling module 103 monitors for faults in the data plane. For example, an ingress node may send Operations, Administration and Management (OAM) packets along the data plane which, for fast protection, are sent at short intervals (typically 3.3 ms). Module may monitor receipt of these packets and raise an alarm if packets are not received in an expected manner (e.g. if three consecutive periodic OAM packets are not received). Module 103 can send signalling, such as an OAM packet carrying an Alarm Indication Signal (AIS), along the data plane to other nodes.

A control plane signalling module 104 receives control plane signalling messages, such as GMPLS RSVP-TE messages, and outputs control plane signalling messages. Advantageously, the control plane signalling messages are RSVP-TE messages of the form previously described. If node 100 is a branch/merge node, module 104 can send a signalling message to an ingress/egress node, indicating that the node wishes to be notified when a failure has occurred outside the recovery domain of the segment. If node 100 is an ingress/egress node, module 104 can send a signalling message to a branch/merge node to notify the branch/merge node when a failure has occurred outside the recovery domain of the segment. If node 100 is an ingress/egress node, module 104 includes decision logic 105. Decision logic 105 determines if, in response to receiving failure detection signalling, the failure is inside or outside a segment of a working path and if there is a need to issue a control plane signalling message to a branch/merge node to prevent or revert recovery.

A store 106 stores data used by the controller 102. This data includes details 107 of LSPs established in the network 5 and a list 108 of branch/merge nodes that have requested to be notified if a failure is internal/external to their segment of a LSP. Data 107 allows the decision logic 105 to determine if a failure is inside a segment or outside a segment where a segment recovery mechanism exists. This allows decision logic 105 to issue a signalling message to a branch/merge node when control plane failure signalling is received.

Figure 9:
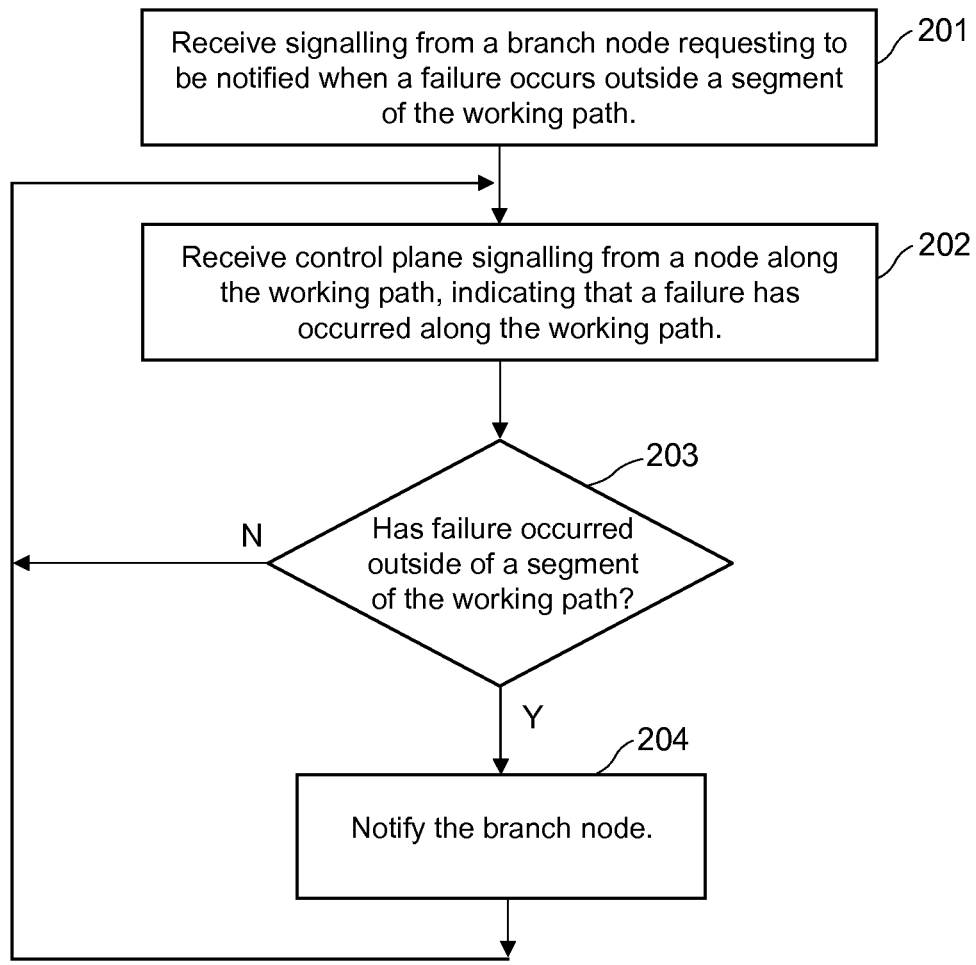
FIG. 9 shows a method performed by a branch/merge node of the network in accordance with an embodiment of the present invention.

FIG. 9 shows a method performed by an ingress/egress node in the network. At step 201 the node receives signalling from a branch/merge node requesting to be notified when a failure occurs outside a segment of the working path. At step 202 the node receives control plane signalling from a node along the working path, indicating that a failure has occurred along the working path. Step 203 determines if failure occurred outside of a segment of the working path. If it is determined that the failure is outside the segment, the method proceeds to step 204 and sends a control plane message to the node. If it is determined that the failure is internal to the segment, the method returns to step 202.

Figure 10:
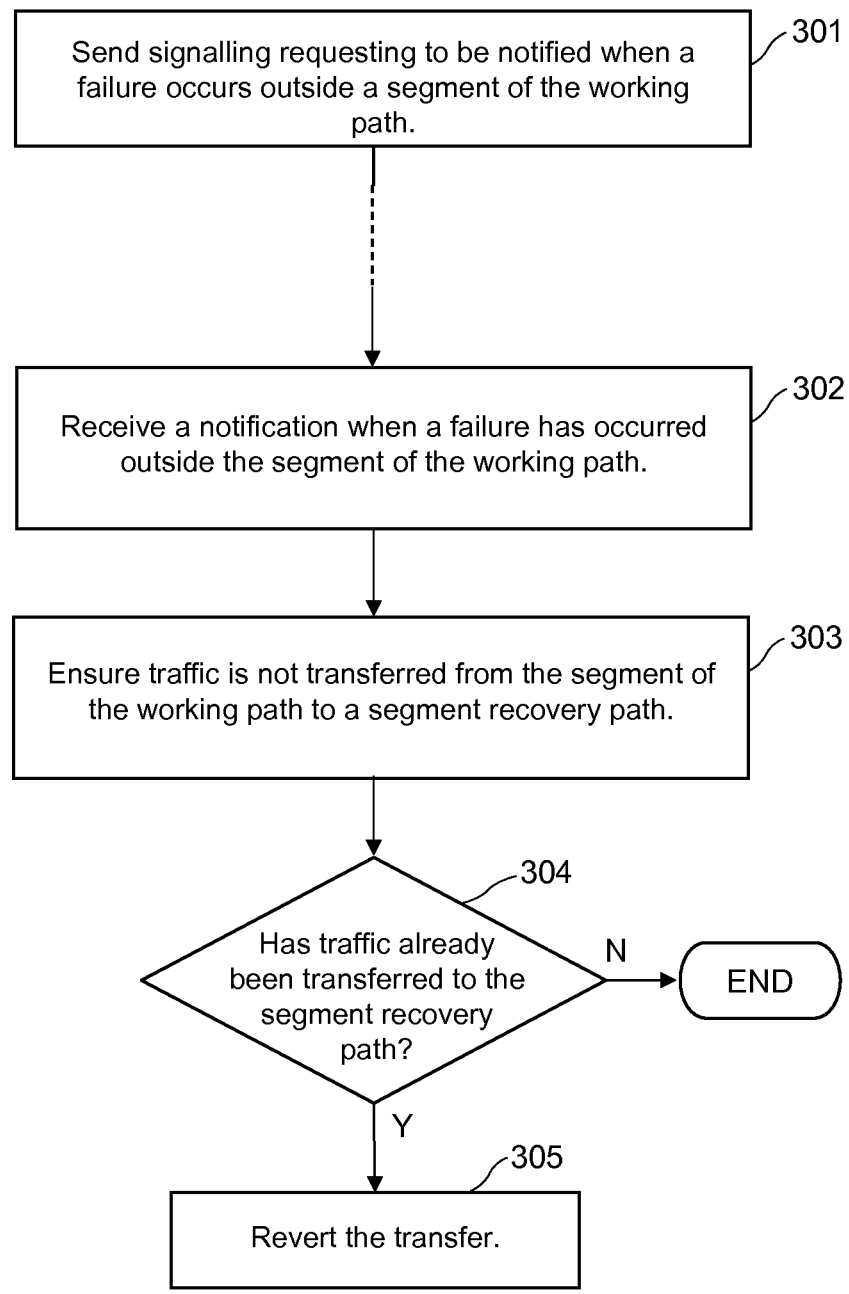
FIG. 10 shows a method performed by an ingress/egress node of the network in accordance with an embodiment of the present invention.

FIG. 10 shows a method performed by a branch/merge node in the network. At step 301 the node sends signalling requesting to be notified when a failure occurs outside a segment of the working path. At a later time, at step 302, the node receives a notification when a failure has occurred outside the segment of the working path. At step 303 the node ensures traffic is not transferred from the segment of the working path to a segment recovery path. This can comprise a step 304 of determining if traffic has already been transferred to the segment recovery path. If traffic has not been transferred to the segment recovery path, the method ends. If traffic has already been transferred to the segment recovery path, the method proceeds to step 305 and reverts the transfer.

Shared Recovery

Figure 11:
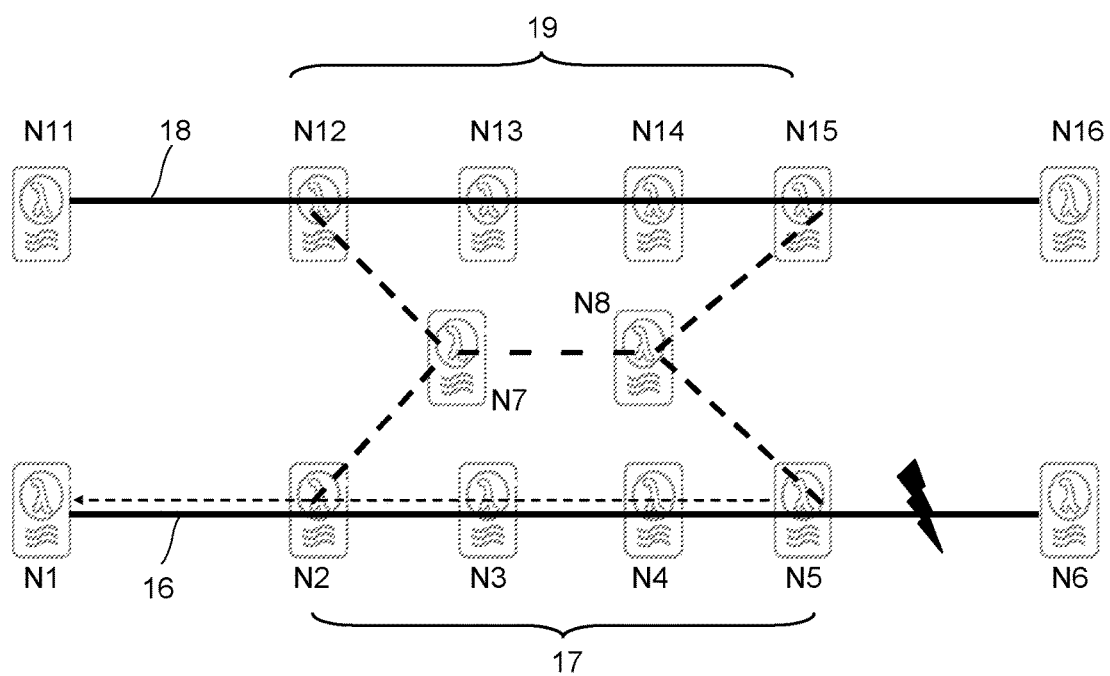
FIG. 11 shows another network topology with shared recovery resources.

To simplify explanation, the embodiments shown in FIGS. 4 to 7 show a recovery path 12 which is dedicated to the segment 11. FIG. 11 shows another network topology in which at least some of the recovery resources are shared between multiple working paths. There is a first working path LSP 16 (N1-N2-N3-N4-N5-N6) and a second working path LSP 18 (N11-N12-N13-N14-N15-N16). There is a segment recovery path LSP 17 (N2-N7-N8-N5) for a segment 17 of the first working path 16 and a segment recovery path LSP (N12-N7-N8-N15) for a segment 19 of the second working path 18. It can be seen that the segment recovery paths share resources on the span N7-N8. This means that if a failure affects working path 16, the segment recovery path, traffic is transferred to the segment recovery path (N2-N7-N8-N5) and the segment recovery path (N12-N7-N8-N15) is unavailable. It can be seen that unnecessary activation of the segment recovery path can use shared resources and deny another working path from recovery.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a node in a connection-oriented network in which there is a working path and a segment recovery path for a segment of the working path, the working path having a branch node at an end of the segment where the segment recovery path connects to the working path, the branch node not being located at an end node of the working path, the method comprising:
   receiving control plane signalling at the end node of the working path from a node along the working path, indicating that a failure has occurred along the working path;
   determining, from the received control plane signalling, if the failure has occurred outside the segment of the working path; and
   when it is determined that the failure has occurred outside the segment of the working path, notifying the branch node.

2. A method according to claim 1 wherein the notification is an instruction not to reroute to the segment recovery path.

3. A method according to claim 1 further comprising an initial step of receiving signalling from the branch node requesting to be notified when a failure occurs outside the segment of the working path.

4. A method according to claim 3 wherein the signalling comprises an RSVP-TE Notify message carrying a <NOTIFY_REQUEST> object set to a predetermined value.

5. A method of operating a branch node in a connection-oriented network in which there is a working path and a segment recovery path for a segment of the working path, the branch node being located at an end of the segment where the segment recovery path meets the working path, the branch node not being located at an end node of the working path, the method comprising:
   requesting, by the branch node, to be notified when a failure occurs outside the segment of the working path.

6. A method according to claim 5 further comprising:
   receiving a notification when a failure has occurred outside the segment of the working path; and
   ensuring that traffic is not transferred from the segment of the working path to the segment recovery path.

7. A method according to claim 6 wherein the step of ensuring that traffic is not transferred from the working path to the segment recovery path comprises:
   determining if the branch node has already made a transfer of traffic from the segment of the working path to the segment recovery path in response to data plane failure detection signalling; and
   if it is determined that the branch node has already made a transfer, reverting the transfer of traffic from the segment of the working path to the segment recovery path.

8. A method according to claim 5 wherein the notification that a failure has occurred outside the segment of the working path comprises an RSVP-TE Notify message carrying a <NOTIFY_REQUEST> object set to a predetermined value.

9. An apparatus for use at a node of a connection-oriented network in which there is a working path and a segment recovery path for a segment of the working path, the working path having a branch node at an end of the segment where the segment recovery path connects to the working path, the branch node not being located at an end node of the working path, the apparatus comprising:
   a non-transitory storage medium having stored therein a control plane signalling module; and
   a controller coupled to the non-transitory storage medium, the controller configured to execute the control plane signalling module, the control plane signalling module configured to receive an indication from a node along the working path that a failure has occurred along the working path, determine, from the indication, if the failure has occurred outside the segment of the working path, and when it is determined that the failure has occurred outside the segment of the working path, notify the branch node.

10. The apparatus according to claim 9 wherein the control plane signalling module is configured to notify the branch node by sending an instruction not to reroute to the segment recovery path.

11. The apparatus according to claim 9 wherein the control plane signalling module is further configured to receive signalling from the branch node requesting to be notified when a failure occurs outside the segment of the working path.

12. An apparatus for use at a branch node of a connection-oriented network in which there is a working path and a segment recovery path for a segment of the working path, the branch node being located at an end of the segment where the segment recovery path meets the working path, the branch node not being located at an end node of the working path, the apparatus comprising:
a non-transitory storage medium having stored therein a control plane signalling module; and
a controller coupled to the non-transitory storage medium, the controller configured to execute the control plane signalling module, the control plane signalling module configured to send a request for the branch node to be notified when a failure occurs outside the segment of the working path.

13. The apparatus according to claim 12 wherein the control plane signalling module further configured to receive a notification when a failure has occurred outside the segment of the working path, and to ensure that traffic is not transferred from the segment of the working path to the segment recovery path.

14. The apparatus according to claim 13, wherein the controller is further configured to execute a data plane signalling module, the data plane signalling module configured to receive data plane failure detection signalling and wherein the control plane signalling module is further configured arranged to ensure that traffic is not transferred by determining if the branch node has already made a transfer of traffic from the segment of the working path to the segment recovery path in response to data plane failure detection signalling and if it is determined that the branch node has already made a transfer, revert the transfer of traffic from the segment of the working path to the segment recovery path.

15. A non-transitory machine readable storage medium having instructions stored thereon when executed by a processor cause the processor to perform a method of operating a node in a connection-oriented network in which there is a working path and a segment recovery path for a segment of the working path, the working path having a branch node at an end of the segment where the segment recovery path connects to the working path, the branch node not being located at an end node of the working path, the method comprising:
receiving control plane signalling at the end node of the working path from a node along the working path, indicating that a failure has occurred along the working path;
determining, from the received control plane signalling, if the failure has occurred outside the segment of the working path; and
when it is determined that the failure has occurred outside the segment of the working path, notifying the branch node.

16. The non-transitory computer readable storage medium of claim 15, wherein the notification is an instruction not to reroute to the segment recovery path.

17. The non-transitory computer readable storage medium of claim 15, wherein the method further comprises an initial step of receiving signalling from the branch node requesting to be notified when a failure occurs outside the segment of the working path.

18. The non-transitory computer readable storage medium of claim 17, wherein the signalling comprises an RSVP-TE Notify message carrying a <NOTIFY_REQUEST> object set to a predetermined value.

19. A non-transitory machine readable storage medium having instructions stored thereon when executed by a processor cause the processor to perform a method of operating a branch node in a connection-oriented network in which there is a working path and a segment recovery path for a segment of the working path, the branch node being located at an end of the segment where the segment recovery path meets the working path, the branch node not being located at an end node of the working path, the method comprising:
requesting to be notified when a failure occurs outside the segment of the working path.

20. The non-transitory computer readable storage medium of claim 19, wherein the method further comprises:
receiving a notification when a failure has occurred outside the segment of the working path; and
ensuring that traffic is not transferred from the segment of the working path to the segment recovery path.

21. The non-transitory computer readable storage medium of claim 20, wherein the step of ensuring that traffic is not transferred from the working path to the segment recovery path comprises:
determining if the branch node has already made a transfer of traffic from the segment of the working path to the segment recovery path in response to data plane failure detection signalling; and
if it is determined that the branch node has already made a transfer, reverting the transfer of traffic from the segment of the working path to the segment recovery path.

22. The non-transitory computer readable storage medium of claim 19, wherein the notification that a failure has occurred outside the segment of the working path comprises an RSVP-TE Notify message carrying a <NOTIFY_REQUEST> object set to a predetermined value.

* * * * *